United States Patent
Petzen et al.

(10) Patent No.: US 8,745,281 B2
(45) Date of Patent: Jun. 3, 2014

(54) AUTOMATIC FOUNDATION FIELDBUS DEVICE COMMISSIONING

(75) Inventors: John Alexander Petzen, Roanoke, VA (US); Andre Steven DeMaurice, Salem, VA (US); Dana Robert Kreft, Roanoke, VA (US); William Kennedy Galt, Rustburg, VA (US); William Robert Pettigrew, Christiansburg, VA (US)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 13/453,617

(22) Filed: Apr. 23, 2012

(65) Prior Publication Data

US 2013/0282931 A1    Oct. 24, 2013

(51) Int. Cl.
*G06F 13/10* (2006.01)
*G06F 13/42* (2006.01)

(52) U.S. Cl.
USPC ................................. 710/9; 710/3

(58) Field of Classification Search
CPC combination set(s) only.
See application file for complete search history.

(56) References Cited

U.S. PATENT DOCUMENTS

| | | | |
|---|---|---|---|
| 5,980,078 A | * | 11/1999 | Krivoshein et al. ............... 700/1 |
| 8,005,553 B2 | | 8/2011 | Enver et al. |
| 2007/0220186 A1 | * | 9/2007 | Rantanen et al. ............... 710/58 |

OTHER PUBLICATIONS

Fieldbus Foundation, Tech Note, TN-002-1.1, "Format of Device ID," Jul. 29, 1999.
Fieldbus Tutorial, A Foundation Fieldbus Technology Overview, www.smar.com/PDFs/catalogues/FBTUTCE.pdf, Nov. 3, 2010.

* cited by examiner

*Primary Examiner* — Ilwoo Park
(74) *Attorney, Agent, or Firm* — Fletcher Yoder, P.C.

(57) ABSTRACT

A device includes an interface configured to receive an indication of a second device on a network, and a processor configured to determine if the indication is one of an expected set of indications and generate a permanent node address for assignment to the second device if the indication is one of an expected set of indications. The permanent node address places the second device into an active mode as a permanent node addressed device. The processor is further configured to receive at least one device parameter from the permanent node addressed device, determine if the at least one device parameter matches an expected device parameter for the permanent node addressed device, and generate a second permanent node address for assignment to the device if the at least one device parameter matches the expected device parameter for the permanent node addressed device.

20 Claims, 3 Drawing Sheets

| | 82 | 84 | 86 | 88 | 92 |
|---|---|---|---|---|---|
| | DEVICE I.D. | MANUFACTURER I.D. | DEVICE TYPE | DEVICE REV. | NODE I.D. |
| 87 | 001_Model_705 | 0(0x0) | 1(0x001) | 0 | 248 |
| 89 | PFFA-21_1 | 342(0x0156) | 1(0x001) | 2 | 21 |

FIG. 4

| DEVICE I.D. | MANUFACTURER I.D. | DEVICE TYPE | DEVICE REV. | PD_TAG | NODE I.D. | COMP. REV. | CAP. LEV. |
|---|---|---|---|---|---|---|---|
| 001_Model_705 | 0(0x0) | 1(0x001) | 2 | LT-100 | 65 | 2 | 1 |
| PFFA-21_1 | 342(0x0156) | 1(0x001) | 2 | LT-100 | 21 | — | 1 |

FIG. 5

| DEVICE I.D. | MANUFACTURER I.D. | DEVICE TYPE | DEVICE REV. | PD_TAG | NODE I.D. | COMP. REV. | CAP. LEV. |
|---|---|---|---|---|---|---|---|
| 001_Model_705 | 0(0x0) | 1(0x001) | 3 | LT-100 | 65 | 2 | 1 |
| PFFA-21_1 | 342(0x0156) | 1(0x001) | 2 | LT-100 | 21 | — | 1 |

FIG. 6

| DEVICE I.D. | MANUFACTURER I.D. | DEVICE TYPE | DEVICE REV. | PD_TAG | NODE I.D. | COMP. REV. | CAP. LEV. |
|---|---|---|---|---|---|---|---|
| 001_Model_705 | 0(0x0) | 1(0x001) | 3 | LT-100 | 65 | 3 | 1 |
| PFFA-21_1 | 342(0x0156) | 1(0x001) | 2 | LT-100 | 21 | — | 1 |

AUTOMATIC FOUNDATION FIELDBUS DEVICE COMMISSIONING

BACKGROUND OF THE INVENTION

The subject matter disclosed herein relates to industrial process control systems, and more specifically, to the automatic detection and commissioning of process control field devices.

Certain systems, such as industrial control systems, may include Foundation Fieldbus technology to interconnect and distribute control applications to process fieldbus devices. For example, such fieldbus devices may include sensors, actuators, controllers, and so forth interconnected via a local area network (LAN). In the commissioning of fieldbus devices, every device must have a unique network address and physical device tag for the fieldbus to operate properly. Accordingly, configuring and/or programming these multiple devices may be complex and time consuming.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a device includes an interface configured to receive an indication of a second device on a network, and a processor configured to determine if the indication is one of an expected set of indications and generate a permanent node address for assignment to the second device if the indication is one of an expected set of indications. The permanent node address places the second device into an active mode as a permanent node addressed device. The processor is further configured to receive at least one device parameter from the permanent node addressed device, determine if the at least one device parameter matches an expected device parameter for the permanent node addressed device, and generate a second permanent node address for assignment to the device if the at least one device parameter matches the expected device parameter for the permanent node addressed device.

In a second embodiment, a non-transitory computer-readable medium having computer executable code stored thereon is included. The code includes instructions for determining that a second device on a network based on a received indication, determining if the indication is one of an expected set of indications, and generating a permanent node address for assignment to the second device if the indication is one of an expected set of indications. The permanent node address places the second device into an active mode as a permanent node addressed device. The code further includes instructions for receiving at least one device parameter from the permanent node addressed device, determining if the at least one device parameter matches an expected device parameter for the permanent node addressed device, and generating a second permanent node address for assignment to the device if the at least one device parameter matches the expected device parameter for the permanent node addressed device.

In a third embodiment, a method includes determining a second device on a network based on a received indication, determining if the indication is one of an expected set of indications, and generating a permanent node address for assignment to the second device if the indication is one of an expected set of indications. The permanent node address places the second device into an active mode as a permanent node addressed device. The method further includes receiving at least one device parameter from the permanent node addressed device, determining if the at least one device parameter matches an expected device parameter for the permanent node addressed device, and generating a second permanent node address for assignment to the device if the at least one device parameter matches the expected device parameter for the permanent node addressed device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a diagram of a commissioning tag of a fieldbus device in a permanent address location with parameters matching, in accordance with an embodiment;

FIG. 5 is a diagram of a commissioning tag of a fieldbus device in a permanent address location with compatibility revision parameters matching, in accordance with an embodiment; and FIG. 6 is a diagram of a commissioning tag of a fieldbus device in a permanent address location with compatibility revision parameters not matching, in accordance with an embodiment.

DETAILED DESCRIPTION OF THE INVENTION

Figure 1:
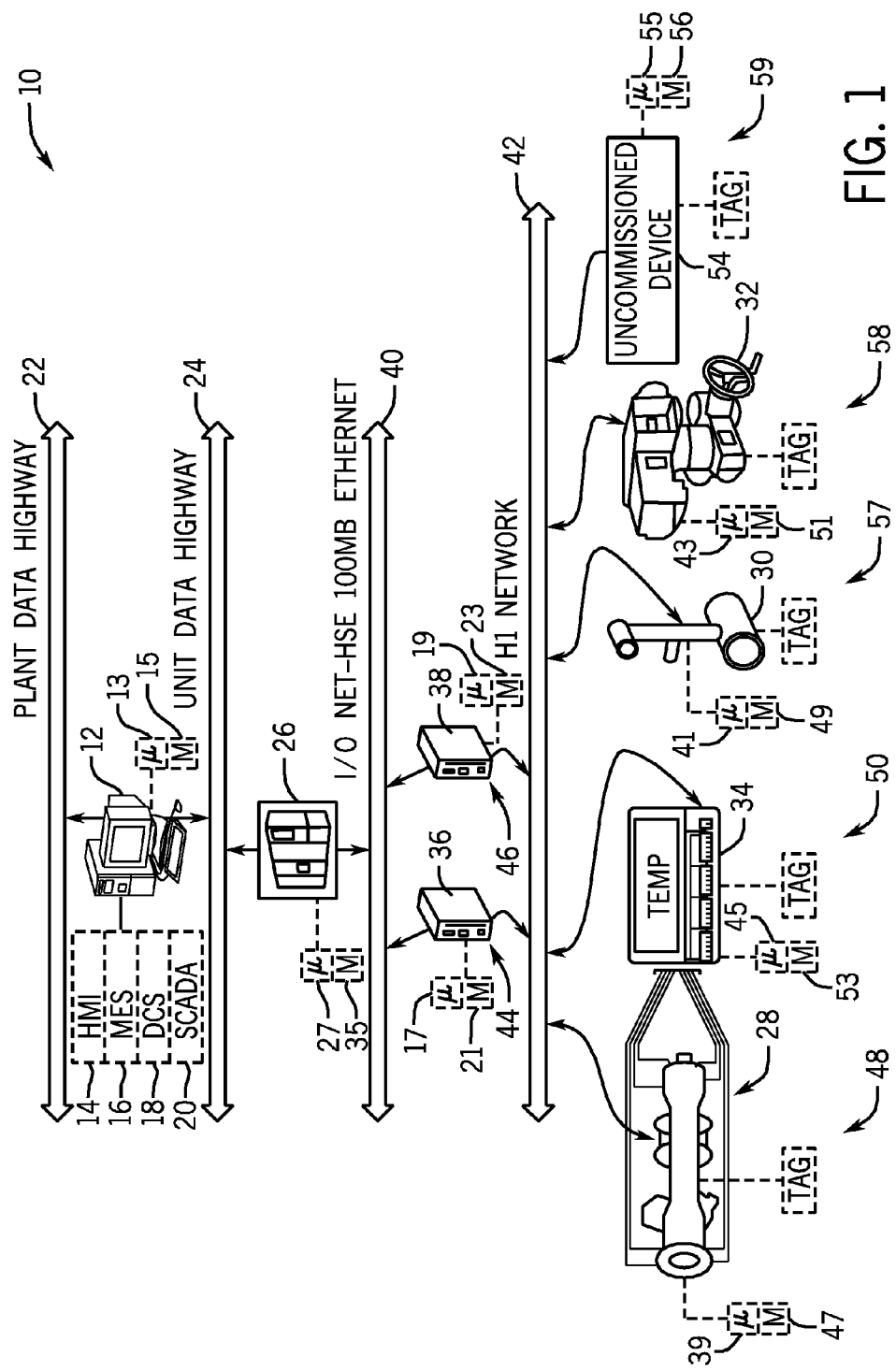
FIG. 1 is a schematic diagram of an embodiment of an industrial process control system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Foundation Fieldbus technology is a digital, serial, and two-way communication system, which interconnects various fieldbus devices such as sensors, pumps, valves, controllers, and the like via a local area network (LAN). Foundation Fieldbus allows the various fieldbus devices to connect via a single wire pair, which contributes to a reduction in hardware and complexity in industrial distributed control systems. For example, in traditional distributed control systems, process control devices may output a 4-20 milliamp (mA) signal to an input/output (I/O) subsystem, which may then output a digital value to a programmable logic controller (PLC) to implement a control strategy. Such system configurations often require extensive cabling, I/O marshaling cabinets, and power supplies. In a Foundation Fieldbus control system, the control strategy is implemented via microprocessor-driven function blocks embedded within each fieldbus device, which allows the devices to connect to a single bus network. However, to commission and distribute control strategies across the Foundation Fieldbus network to un-commissioned fieldbus devices (i.e., a Foundation Fieldbus device that may be connected to a control system in an inactive, offline, or decommissioned state, or in a state in which the fieldbus device is not part of Foundation Fieldbus, the system control strategy, or some combination thereof), each un-commissioned device must have a unique network address and physical device tag. The physical device tag may be assigned to an un-commissioned device offline, which may be performed at a workbench, or online via special default network addresses on the fieldbus. The disclosed embodiments provide a system and method to automatically detect and commission newly connected un-commissioned Foundation Fieldbus field devices.

Turning to FIG. 1, an embodiment of an industrial process control system 10 is depicted. The control system 10 may include a computer 12 suitable for executing a variety of field device configuration and commissioning applications, and for providing an operator interface through which an engineer or technician may monitor the components of the control system 10. Accordingly, the computer 12 includes a processor 13 that may be used in processing computer instructions, and a memory 15 that may be used to store computer instructions and other data. These instructions may be encoded in programs stored in tangible non-transitory computer-readable medium such as the memory 15 or other storage. The computer 12 may include any type of computing device suitable for supporting software applications, such as a laptop, a workstation, a tablet computer, or a handheld portable device (e.g., personal digital assistant or cell phone). Indeed, the computer 12 may include any of a variety of hardware and/or operating system platforms.

In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. The HMI 14, MES 16, DCS 18, and/or SCADA 20 may include executable code instructions stored on non-transitory tangible computer readable media, such as the memory 15 of the computer system 12. In certain embodiments, the computer 12 may support a Foundation Fieldbus host application configured to transmit and receive data stored on the field devices 28, 30, 32, 34, and un-commissioned device 54. For example, computer 12 may support GE Energy GE ControlST, which may assign and distribute network addresses, configuration tools, and other data to a number of Foundation Fieldbus field devices.

Further, the computer 12 is communicatively connected to a plant data highway 22 which may allow for enabling communication between the depicted computer 12 and other computers in the plant. Indeed, the industrial control system 10 may include multiple computer systems interconnected through the plant data highway 22. The computer 12 may be further communicatively connected to a unit data highway 24, which may couple the computer 12 to an industrial controller 26. The industrial controller 26 may include a processor 27 and a memory 35 suitable for executing and storing computer instructions or control logic useful in automating a variety of plant equipment, such as a turbine system 28, a valve 30, a pump 32, temperature sensor 34, and un-commissioned device 54.

As depicted, the turbine system 28, the valve 30, the pump 32, temperature sensor 34, and un-commissioned device 54 are communicatively connected to the industrial controller 26 by using linking devices 36 and 38 suitable for interfacing between an I/O network 40 and an H1 network 42 (i.e., a fieldbus network operating at 31.25 kbits/second.). As depicted, the linking devices 36 and 38 may include processors 17 and 19, respectively, useful in executing computer instructions, and may also include memory 21 and 23, useful in storing computer instructions and other data. In certain embodiments, the I/O network 40 may be a 100 Megabit (MB) high speed Ethernet (HSE) network, and the H1 network 42 may be a 31.25 kilobit/second network. Accordingly, data transmitted and received through the I/O network 40 may in turn be transmitted and received by the H1 network 42. That is, the linking devices 36 and 38 may act as bridges between the I/O network 40 and the H1 network 42. For example, higher speed data on the I/O network 40 may be buffered, and then transmitted at suitable speed on the H1 network 42. Accordingly, a variety of field devices may be linked to the industrial controller 26 and to the computer 12.

Each of the linking devices 36 and 38 may include one or more segment ports 44 and 46 useful in segmenting the H1 network 42. For example, the linking device 36 may use the segment port 44 to communicatively couple with the devices 28 and 34, while the linking device 38 may use the segment port 36 to communicatively couple with the devices 30 and 32. Distributing the input/output between the devices 28, 30, 32, and 34, by using, for example, the segment ports 44 and 46, may enable a physical separation useful in maintaining fault tolerance, redundancy, and improving communications time In certain embodiments, the field devices 28, 30, 32, and 34, may include or may be commissioned Foundation Fieldbus devices that include support for the Foundation H1 bi-directional communications protocol. The un-commissioned device 54 may be one or more Foundation Fieldbus field devices connected in an offline or decommissioned configuration and communicatively coupled to the H1 network 42 of system 10. For example, un-commissioned device 54 may be a variety of field devices, including but not limited to a flow meter, temperature sensor, vibration sensor, pressure transmitter, pump, actuator, valve, and so forth.

In certain embodiments, each field device 28, 30, 32, 34, and un-commissioned device 54 may include one or more commissioning device tags 48, 50, 57, 58, and 59 having Foundation Fieldbus device parameters. As it may be worth noting, the device tag and/or the physical device tag may also be referred to as a device signature and/or physical device signature. As will also be discussed in further detail, the commissioning device tag may include, for example, device parameters such as the device identification number, manufacturer identification, network node address, device type and revision, physical device tag, compatibility revision, and so forth. FIGS. 3, 4, 5, and 6 display examples of the information that may be included as part of the commissioning device tag 59. This information may be displayed by a Foundation Fieldbus host application supported by computer 12 or other configuration device. Indeed, the field devices 28, 30, 32, 34, and un-commissioned device 54 may include or may be "smart" devices capable of encapsulating and executing computer instructions. Accordingly, the field devices 28, 30, 32, 34, and un-commissioned device 54 may include respective processors 39, 41, 43, 45, and 55 suitable for executing computer instructions, which may be encoded in programs stored in tangible non-transitory computer-readable medium such as the respective memory devices 47, 49, 51, 53 and 56. The memory devices 47, 49, 51, 53 and 56 may each also store other data such as commissioning device tag information.

Each field device 28, 30, 32, 34, and un-commissioned device 54 may include wireless (e.g., WLAN, PAN) communication, Ethernet (e.g., LAN), or input/output functionality to connect to handheld and portable configuration devices. In certain embodiments, a handheld communicator may be utilized in implementing presently disclosed methods of automatically detecting and commissioning the un-commissioned device 54. For example, an operator or technician may utilize a handheld communicator device to connect to Foundation Fieldbus field devices to reassign network node addresses or perform similar configurations. In addition, a handheld communicator device may be utilized by an operator or engineer at a workbench to execute offline configurations of field devices 28, 30, 32, 34, and un-commissioned device 54.

In certain embodiments, the control system 10 of FIG. 1 may be utilized and configured to implement methods of automatically detecting and commissioning the un-commissioned device 54, as will be discussed henceforth. For purposes of description and illustration, the aforementioned automatic detection and commissioning methods will be discussed with respect to the flow diagram of FIG. 2 in conjunction with FIGS. 3, 4, 5, and 6.

Figures 2, 3:
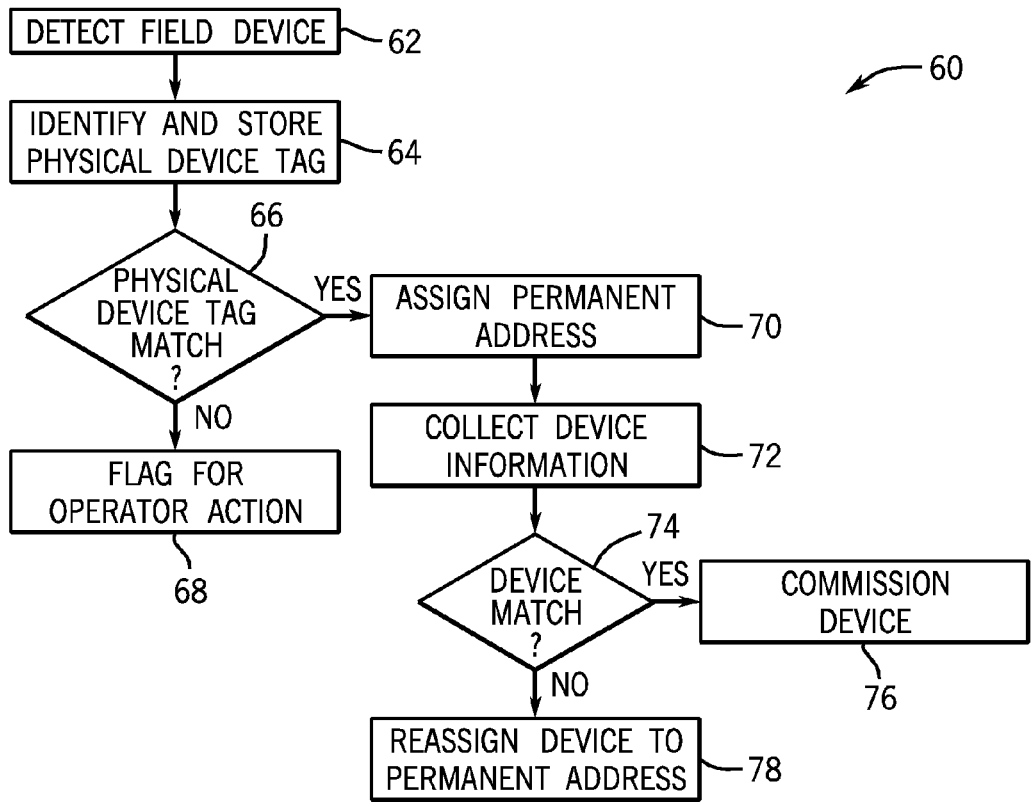
FIG. 2 is a block diagram of an embodiment of the industrial process control system of FIG. 1.
FIG. 3 is a diagram of a commissioning tag of a fieldbus device in a temporary address location, in accordance with an embodiment.

Turning now to FIG. 2, a flow diagram is presented, illustrating a process 60 of detecting and automatically commissioning an un-commissioned device 54 via the system 10 of FIG. 1, in accordance with certain embodiments. As will be discussed in further detail in conjunction with FIG. 2, FIG. 3 displays commissioning tag 59 information of an un-commissioned device 54 at a temporary node address, while FIGS. 4, 5, and 6 display commissioning tag 59 information of an un-commissioned device 54 at a permanent node address. In certain embodiments, the connected un-commissioned device 54 may be detected at a temporary node address by a Foundation Fieldbus host application supported by the processor 13 of computer 12 or other configuration device (block 62 of FIG. 2). The commissioning device tag 59 display of a field device at temporary address, as depicted in FIG. 3, may include a number of parameter fields.

As depicted, the commissioning device tag 59 includes a row 87 displaying device information, and a row 89 displaying control system offline pre-configuration information. The device identification field 82 may include an alphanumeric string of data that corresponds to a particular device. For example, as depicted in FIG. 3, "001 Model 705" may correspond to a device having a manufacturer identification number of "001", a model type of "Model," and a serial number of "705." It should be appreciated that the information (e.g., "001 Model 705" and "PFFA-211") of the device identification field 82 depicted in FIG. 3 for each of the un-commissioned device 54 (e.g., at row 87) and the control system offline pre-configuration (e.g., at row 89) are included for the purpose of example and illustration. Indeed, the information in device identification field 82 may, in some embodiments, for example, correspond to the device ID field discussed in the Fieldbus Foundation™ Tech Note TN-002-1.1. Thus, in certain embodiments, the device identification field 82 may include a visible string data type of up to 32 octets in data string length. For example, a first number of octets may be a unique pre-registered manufacturer identification number in accordance with Fieldbus Foundation™ standards while a second number of octets, for example, may be a unique visible data string (e.g., serial number) assigned by the manufacturer to individually identify a particular and specific device.

Parameter field 84 includes the manufacturer identification number, which may be a string of binary, decimal, or hexadecimal characters. Parameter field 86 may include the device type information, such as the function of the device and location within a given process. For example, "PT-B0321C" may be a pressure transmitter monitoring the pressure of a boiler inside housing 321C of a process plant.

The parameter field 88 may include the device revision, which may be used to indicate hardware, firmware, or software versions of a device, as set by the device manufacturer. For example, a manufacturer of temperature transmitters may develop more precise thermocouples as part of a new temperature transmitter device assembly. As these thermocouples are added to the temperature transmitter assembly, a new temperature transmitter may be assigned a new device revision number. Similar to the manufacturer identification number, the device type and device revision may respectively be a string of binary, decimal, or hexadecimal characters. The node I.D. parameter field 92 may display a network node address in the range of 0-255. In accordance with certain embodiments, network node addresses 16-247 may be reserved for permanently addressed field devices. The assignment of a permanent node address may refer to the placing of a device in an active mode, or a state in which the Foundation Fieldbus host application may collect additional field device information and/or field device parameters. The network node addresses 248-251 may be reserved for field devices having a temporary node address or no permanent node address. For example, as again depicted in FIG. 3, un-commssioned device 54 at row 87 is detected at the temporary node address 248. The remaining node addresses 252-255 may be reserved for temporary devices (e.g., handheld devices).

As will be discussed further, the commissioning device tag 59 of an un-commissioned device 54 at a temporary node address may not include one or more parameter fields as that of a commissioning device tag 59 at a permanent node address. For example, at a permanent node address, the commissioning device tag 59 may include a physical device tag parameter field 90, compatibility revision parameter field 94, and capability level parameter field 96. This is illustrated in FIGS. 4, 5, and 6.

The physical device tag may be a unique indicator of an un-commissioned device 54, allowing the Foundation Fieldbus host application to identify and distribute control strategies or algorithms to the un-commissioned device 54. For example, the physical device tag parameter field 90 of FIG. 4 displays the detected $100^{th}$ Level Transmitter (LT_100) within a process control system. Furthermore, the compatibility revision parameter field 94 may include the revision number of a backwards or bi-directionally compatible un-commissioned device 54. To further explain, anytime Foundation Fieldbus field devices 28, 30, 32, 34, and un-commissioned device 54 may undergo device revisions, there may also be revisions required for other device parameters such as firmware, operating system, device description file, and so forth. For example, as again depicted in FIG. 4, the compatibility revision parameter field 94 of un-commissioned device 54 at row 87 displays a device revision number of 2. In such a case, it follows that the un-commissioned device 54 may be compatible or backwards compatible with the control system offline pre-configuration having a device revision number of 2.

Similarly, the capability level parameter field 96 may include a level number indicative of whether or not a software version, capability, or other similar feature is supported (e.g., licensed) or capable of communication with the control system offline pre-configuration. For example, as again depicted in FIG. 4, the capability level parameter field 96 of un-commissioned device 54 at row 87 and the control system offline pre-configuration at row 89 each display a capability level number of 1. Accordingly, the un-commissioned device 54 may, for example, be supported and used with the control strategy of control system offline pre-configuration.

As discussed previously, in order for fieldbus devices to be automatically commissioned, each Foundation Fieldbus field device must have a unique network node address and physical device tag. Referring back again to FIG. 3, the connected un-commissioned device 54 may be detected at, for example, a temporary node address 248, as depicted in row 87 beneath the parameter field 92. The control system may be pre-configured to commission field devices at a permanent node address. For example, as depicted in row 89 beneath parameter field 92, the control system may be pre-configured to assign permanent node address 21 to connected field devices to be commissioned. In accordance with certain embodiments, the Foundation Fieldbus host application supported by the processor 13 of computer 12 may identify and store the physical device tag of the connected un-commissioned device 54 (block 64 of FIG. 2). Subsequently, the Foundation Fieldbus host application supported by the processor 13 of computer 12 may compare the physical device tag of un-commissioned device 54 with the control system offline pre-configuration of known field devices to determine if the respective configurations match (block 66 of FIG. 2).

If the Foundation Fieldbus host application supported by the processor 13 of computer 12 determines that the respective configurations match, then the un-commissioned device 54 may be assigned a permanent node address by the processor 13 (block 70 of FIG. 2). For example, as depicted in the parameter field 90 of FIG. 4, the PD_TAG displays LT-100 (e.g., Level Transmitter 100) for both the un-commissioned device 54 at row 87, as well as the control system offline pre-configuration at row 89.

FIG. 4 also depicts the un-commissioned device 54 assigned a permanent node address of 65 at row 87 beneath parameter field 92. However, if the configuration of un-commissioned device 54 does not match the expected offline configuration of a field device, then the un-commissioned device 54 may be automatically flagged by the Foundation Fieldbus host application supported by the processor 13 for operator action (block 68 of FIG. 2).

In certain embodiments, upon the un-commissioned device 54 being assigned a permanent node address, the Foundation Fieldbus host application supported by the processor 13 may collect the device parameters or other detailed information of the un-commissioned device 54 (block 72 of FIG. 2). For example, again referring to FIG. 4, the Foundation Fieldbus host application may collect and compare the information of the manufacturer I.D. parameter field 84, the device type parameter field 86, the device revision parameter field 88, the PD_TAG parameter field 90, the capability level parameter field 96, and so forth. When the parameter fields 84, 86, 88, 90, and 96 of the un-commissioned device 54 at row 87 of FIG. 4 matches the corresponding parameter fields of the control system offline pre-configuration at row 89, then the un-commissioned device 54 may be automatically commissioned and reassigned the permanent node address of the control system offline pre-configuration by the processor 13 (block 76 of FIG. 2).

Furthermore, when the parameter fields 84, 86, 90, and particularly the device revision field 88 and capability level parameter field 96 of the un-commissioned device 54 matches the corresponding parameter fields of the control system offline pre-configuration, the compatibility revision parameter field 94 is not collected and analyzed by the Foundation Fieldbus host application. For example, the device revision parameter field 88 of un-commissioned device 54 at row 87 and control system offline pre-configuration at row 89 each displays a device revision number of 2. Likewise, the capability level parameter field 96 of un-commissioned device 54 at row 87 and control system offline pre-configuration at row 89 each displays a capability level number of 1. As a result, the compatibility revision parameter field 94 may not be collected and analyzed as a condition for automatically commissioning un-commissioned the device 54.

In certain embodiments, the device revision parameter field 88 of un-commissioned device 54 may not match the corresponding control system offline pre-configuration device revision parameter field. In such the case, the compatibility revision parameter field 94 (depicted in FIGS. 4, 5, and 6) may be collected and analyzed by the Foundation Fieldbus host application before authorizing the automatic commissioning of the un-commissioned device 54.

For example, as depicted in FIG. 5, the device revision parameter field 88 of un-commissioned device 54 at row 87 displays a device revision number of 3, whereas the corresponding parameter field for the control system offline pre-configuration at row 89 displays a device revision number of 2. In accordance with an embodiment, because the compatibility revision parameter field 94 of the un-commissioned device 54 at row 87 contains a device revision number that is equal to or less than that of the device revision parameter field 88 of the control system offline pre-configuration at row 89, the un-commissioned device 54 is automatically commissioned and readdressed to permanent node address 21, as depicted in FIG. 5.

Contrastingly, the compatibility revision parameter field 94 of the un-commissioned device 54 at row 87 may be collected and analyzed by the Foundation Fieldbus host application and be determined to be greater than the device revision parameter field 88 of the control system offline pre-configuration at row 89. In such a case, the automatic commissioning of un-commissioned device 54 fails. The un-commissioned device 54 is then automatically held at a reassigned permanent node address, and flagged for operator action by the processor 13 (block 78 of FIG. 2).

For example, as depicted in FIG. 6, the compatibility revision parameter field 94 of un-commissioned device 54 at row 87 displays a device revision number of 3, whereas the device revision parameter field 88 for the control system offline pre-configuration at row 89 displays a device revision number of 2. In such the case, the un-commissioned device 54 is held at the reassigned permanent node address 65 and flagged for operator action, as depicted in node address parameter field 92 of FIG. 6.

Technical effects of the invention include systems and methods related to the automatic detection and commissioning of Foundation Fieldbus field devices. In the commissioning of fieldbus devices, each device must have a unique network address and physical device tag for the fieldbus to operate properly. This invention automatically determines if a connected un-commissioned field device is compatible with a control system offline pre-configuration by first comparing the physical device tag of the un-commissioned field device to a known field device, and then collecting the manufacturer I.D., device type, device revision, and compatibility revision of the connected un-commissioned field device. If the connected un-commissioned field device is determined to be compatible with the control system offline pre-configuration, the un-commissioned field device is automatically reassigned a permanent node address and commissioned. Accordingly, this invention reduces the time and the likelihood of human error associated with the commissioning of Foundation Fieldbus field devices, which would otherwise require the complex and time-consuming task of configuring and/or programming these multiple fieldbus devices.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A device, comprising:
   an interface configured to automatically receive an indication of a second device on a network, wherein the indication comprises a first device parameter of the second device; and
   a processor configured to:
      compare the first device parameter of the second device with one or more second device parameters corresponding to an offline pre-configuration of a known third device;
      determine if the first device parameter matches the one or more second device parameters;
      generate a permanent node address for assignment to the second device if the first device parameter substantially matches the one or more second device parameters, wherein the permanent node address places the second device into an active mode as a permanent node addressed device;
      receive a third device parameter from the permanent node addressed device, wherein the third device parameter comprises a compatibility revision of the permanent node addressed device, and wherein the compatibility revision comprises a second indication of a forward compatibility or backward compatibility of the permanent node addressed device;
      determine if the third device parameter matches an expected device parameter for the permanent node addressed device; and
      generate a second permanent node address for assignment to the device if the third device parameter matches the expected device parameter for the permanent node addressed device.

2. The device of claim 1, wherein the processor is configured to generate an error if the first device parameter does not match the one or more second device parameters.

3. The device of claim 1, wherein the processor is configured to generate an activation signal to integrate the permanent node addressed device into the network if the third device parameter matches the expected device parameter for the permanent node addressed device.

4. The device of claim 1, wherein the processor is configured to generate an activation signal to integrate the permanent node addressed device into the network if the third device parameter is compatible with the expected device parameter for the permanent node addressed device.

5. The device of claim 1, wherein the indication of the second device on the network comprises a physical device signature.

6. The device of claim 5, wherein the physical device signature comprises one or more indicators related to physical characteristics or software capabilities of the second device.

7. The device of claim 1, wherein the one or more second device parameters comprises a physical device (PD) tag parameter, a device revision parameter, a manufacturer identification parameter, or any combination thereof.

8. The device of claim 1, wherein the third device parameter comprises a capability level of the permanent node addressed device, and wherein the capability level comprises an indication of a software version, a software capability, a software configuration, or any combination thereof, of the permanent node addressed device.

9. The device of claim 1, wherein the second device comprises a Fieldbus Foundation device, and wherein the compatibility revision comprises a Fieldbus Foundation parameter.

10. A non-transitory computer-readable medium having computer executable code stored thereon, the code comprising instructions for:
   determining automatically that a second device on a network based on a received indication, wherein the indication comprises a first device parameter of the second device;
   comparing the first device parameter of the second device with one or more second device parameters corresponding to an offline pre-configuration of a known third device;
   determining if the first device parameter matches the one or more second device parameters;
   generating a permanent node address for assignment to the second device if the first device parameter matches the one or more second device parameters, wherein the permanent node address places the second device into an active mode as a permanent node addressed device;
   receiving a third device parameter from the permanent node addressed device, wherein the third device parameter comprises a compatibility revision of the permanent node addressed device, and wherein the compatibility revision comprises a second indication of a forward compatibility or backward compatibility of the permanent node addressed device;
   determining if the third device parameter matches an expected device parameter for the permanent node addressed device; and
   generating a second permanent node address for assignment to the device third device parameter matches the expected device parameter for the permanent node addressed device.

11. The non-transitory computer-readable medium of claim 10, wherein the code comprises instructions for generating an error if the first device parameter does not match the one or more second device parameters.

12. The non-transitory computer-readable medium of claim 10, wherein the code comprises instructions for generating an activation signal to integrate the permanent node addressed device into the network if the third device parameter matches the expected device parameter for the permanent node addressed device.

13. The non-transitory computer-readable medium of claim 10, wherein the code comprises instructions for generating an activation signal to integrate the permanent node addressed device into the network if the third device parameter is compatible with the expected device parameter for the permanent node addressed device.

14. The non-transitory computer-readable medium of claim 10, wherein the indication of the second device on the network comprises a physical device signature comprising one or more indicators related to physical characteristics or software capabilities of the second device.

15. A method comprising:
   determining automatically that a second device on a network based on a received indication, wherein the indication comprises a first device parameter of the second device;
   comparing the first device parameter of the second device with one or more second device parameters corresponding to an offline pre-configuration of a known third device;
   determining if the first device parameter matches the one or more second device parameters;
   generating a permanent node address for assignment to the second device if the first device parameter matches the one or more second device parameters, wherein the permanent node address places the second device into an active mode as a permanent node addressed device;
   receiving a third device parameter from the permanent node addressed device, wherein the third device parameter comprises a compatibility revision of the permanent node addressed device, and wherein the compatibility revision comprises a second indication of a forward compatibility or backward compatibility of the permanent node addressed device;
   determining if the third device parameter matches an expected device parameter for the permanent node addressed device; and
   generating a second permanent node address for assignment to the device third device parameter matches the expected device parameter for the permanent node addressed device.

16. The method of claim 15, comprising generating an error if the first device parameter does not match the one or more second device parameters.

17. The method of claim 15, comprising generating an activation signal to integrate the permanent node addressed device into the network if the third device parameter matches the expected device parameter for the permanent node addressed device.

18. The method of claim 15, comprising generating an activation signal to integrate the permanent node addressed device into the network if the third device parameter is compatible with the expected device parameter for the permanent node addressed device.

19. The medium of claim 15, wherein the indication of the second device on the network comprises a physical device signature.

20. The medium of claim 19, wherein the physical device signature comprises one or more indicators related to physical characteristics or software capabilities of the second device.

* * * * *